US009766969B2

(12) United States Patent
Prabhakara

(10) Patent No.: US 9,766,969 B2
(45) Date of Patent: Sep. 19, 2017

(54) ASSESSING AND IMPROVING QUALITY OF EVENT LOGS INCLUDING PRIORITIZING AND CLASSIFYING ERRORS INTO ERROR-PERSPECTIVE AND ERROR-TYPE CLASSIFICATIONS

(71) Applicant: Xerox Corporation, Norwalk, CT (US)

(72) Inventor: Jagadeesh Chandra Bose Rantham Prabhakara, Andhra Pradesh (IN)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 14/743,401

(22) Filed: Jun. 18, 2015

(65) Prior Publication Data
US 2016/0371132 A1    Dec. 22, 2016

(51) Int. Cl.
*G06F 11/07* (2006.01)

(52) U.S. Cl.
CPC ........ *G06F 11/079* (2013.01); *G06F 11/0745* (2013.01); *G06F 11/0751* (2013.01); *G06F 11/0781* (2013.01); *G06F 11/0787* (2013.01); *G06F 11/0793* (2013.01); *G06F 11/0766* (2013.01); *G06F 11/0778* (2013.01)

(58) Field of Classification Search
CPC .. G06F 11/30; G06F 11/3051; G06F 11/3055; G06F 11/0766; G06F 11/0778; G06F 11/0781; G06F 11/079
See application file for complete search history.

(56) References Cited

U.S. PATENT DOCUMENTS 5,870,762 A    2/1999  Lee
6,065,017 A    5/2000  Barker
(Continued)

FOREIGN PATENT DOCUMENTS

WO    2014092697 A1    6/2014

OTHER PUBLICATIONS

W.M.P. Van der Aalst et al., IEEE Task Force on Process Mining: "Process Mining Manifesto," In F. Daniel, K. Barkaoui, S. Dustdar (Eds.): BPM 2011 Workshops. vol. 99 of Lecture Notes in Business Information Processing, Springer-Verlag, Berlin (2011) pp. 169-194.

(Continued)

*Primary Examiner* — Joseph Schell
(74) *Attorney, Agent, or Firm* — Gibb & Riley, LLC

(57) ABSTRACT

Systems and methods receive manually created event logs that include manually entered data of executed processes, and such systems and methods automatically identify errors in the event logs (based on whether the data violates expected log content). The systems and methods classify the errors, prioritize the event logs into a priority order (based on a previously established error priority ranking), and output the event logs classified into different classifications (and in priority order). The systems and methods receive feedback in order to alter the priority order and the different classifications of the event logs. Further, these systems and methods automatically generate recommendations to correct the errors, using different recommendation processes based on the classifications of the errors. The event logs are output in the different classifications and in the priority order, and the locations of the errors within the event logs are identified by the systems and methods herein.

17 Claims, 9 Drawing Sheets

(56) References Cited

U.S. PATENT DOCUMENTS

| | | | |
|---|---|---|---|
| 7,190,478 | B2 | 3/2007 | Caffaray, Jr. et al. |
| 7,346,565 | B2* | 3/2008 | Byrne ................. G06Q 20/102 705/34 |
| 7,373,552 | B2 | 5/2008 | Bjorsne |
| 7,650,334 | B2 | 1/2010 | Tenorio et al. |
| 7,693,805 | B2 | 4/2010 | Koran |
| 8,468,167 | B2 | 6/2013 | Sathyanarayana et al. |
| 8,630,443 | B2 | 1/2014 | Tan et al. |
| 8,762,948 | B1 | 6/2014 | Zaitsev |
| 2002/0087440 | A1* | 7/2002 | Blair ....................... G06Q 10/06 705/29 |
| 2003/0191665 | A1* | 10/2003 | Fitzgerald ............. G06F 19/322 705/2 |
| 2004/0018506 | A1* | 1/2004 | Koehler ............... C12Q 1/6858 435/6.12 |
| 2005/0187368 | A1* | 8/2005 | Ebling ................. G06F 21/552 528/44 |
| 2007/0112671 | A1* | 5/2007 | Rowan ................... G06Q 20/10 705/39 |
| 2009/0147294 | A1 | 6/2009 | Handley et al. |
| 2010/0094888 | A1 | 4/2010 | Schiehlen |
| 2011/0302063 | A1* | 12/2011 | Bey ........................ G06Q 40/12 705/30 |
| 2014/0358723 | A1* | 12/2014 | Ballaro ................ G06Q 10/087 705/26.8 |

OTHER PUBLICATIONS

R.P.Jagadeesh Chandra Bose et al. "Wanna Improve Process Mining Results? It's High Time We Consider Data Quality Issues Seriously", IEEE Symposium on Computational Intelligence and Data Mining (CIDM) 2013. pp. 127-134.

W.M.P. van der Aalst, "Process Mining: Discovery, Conformance and Enhancement of Business Processes", Springer-Verlag, Berlin-Heidelberg, 2011, ISBM 978-3-642-19344-6, Abstract.

W.M.P. van der Aalst, A. Adriansyah, and B.F. van Dongen, "Replaying History on Process Models for Conformance Checking and Performance Analysis", Wiley Interdisciplinary Reviews: Data Mining and Knowledge Discovery archive, vol. 2 Issue 2, Mar. 2012, pp. 182-192, Abstract.

Massimiliano de Leoni, Fabrizio Maria Maggi, and Wil M. P. van der Aalst, "Aligning Event Logs and Declarative Process Models for Conformance Checking", BPM, Lecture Notes in Computer Science vol. 7481, 2012, pp. 82-97, Abstract.

R.P.J.C. Bose and W.M.P. van der Aalst, "Process Diagnostics Using Trace Alignment: Opportunities, Issues, and Challenges", Information Systems, vol. 37 Issue 2, Apr. 2012, pp. 117-141.

* cited by examiner

MODEL  a b c >> d e f
LOG    a b c f d e >> ← "f" HAS TO BE INSERTED —154
         ↑
INCORRECT POSITION FOR
EXECUTION OF "f" —152 a b c f d e >>
            ↖ 162

ASSESSING AND IMPROVING QUALITY OF EVENT LOGS INCLUDING PRIORITIZING AND CLASSIFYING ERRORS INTO ERROR-PERSPECTIVE AND ERROR-TYPE CLASSIFICATIONS

BACKGROUND

Systems and methods herein generally relate to activities that are performed using machines and performed manually, and to event logs that record such activities, and also to the improvement on the quality of such event logs.

Many of today's business processes are supported by information systems. These information systems can record or "log" events pertaining to process executions in several different formats, e.g., text files, databases. Such event logs can be analyzed (e.g., using process mining techniques) to gain insights on processes and thereby assist in process improvement efforts. For any corrective action, such as process repair/process improvement based on event log analytics, the uncovered insights should be accurate and reliable. However, in many processes that involve activities executed manually, event logging is done by the individuals executing the activities. Several data quality issues (e.g., missing data, incorrect data, irrelevant data, imprecise data, etc.) can develop in the process of manually generating event logs. This raises questions on the reliability of any insights obtained through analytics of manually executed activities.

SUMMARY

Exemplary methods herein receive event logs that include manually entered data of executed processes. For example, each of the executed processes can contain a sequence of events, and each of the event attributes can include an activity name, a timestamp, a resource, activity data, etc. Each event is generally associated with only one process instance.

The event logs may contain errors introduced by the manual entry of the data. Therefore, these methods automatically identify the errors in the event logs based on whether the data violates expected log content. For example, the methods herein can identify the errors by using workflow and process models, business and domain-specific rules, generic rules, organizational rules, etc.

The methods herein classify the errors into different classifications that can include "error-perspective" classifications, "error-type" classifications, etc. The error-perspective classifications can include a "control-flow" error class, a "data" error class, a "resource" error class, a "time" error class, etc. The error-type classifications can include an "incorrect" error class, a "missing" error class, an "imprecise" error class, an "irrelevant" error class, etc.

The methods herein prioritize the event logs into a priority order (based on a previously established error priority ranking) and output the event logs classified into different classifications (and in priority order). The methods receive feedback in response to outputting the event logs, in order to alter the priority order and the different classifications of the event logs. Additionally, such methods can alter the recommendation models based on the feedback.

Further, these methods automatically generate recommendations to correct the errors, using different recommendation processes based on the classifications of the errors. The different recommendation processes can include, for example, a replay process, a trace alignment process, etc. The recommendations can include recommending removal of a log entry, insertion of a log entry, repositioning of a log entry, etc. The event logs are output in the different classifications and in the priority order, and the locations of the errors within the event logs are identified by the methods herein.

Exemplary systems herein include, among other components, a first computerized device that receives created event logs. A computerized network connects the first computerized device to a second computerized device. Such manually created logs can include manually entered data of executed processes. For example, each of the executed processes can contain a sequence of events, and each of the event attributes can include an activity name, a timestamp, a resource, activity data, etc. Each event is generally associated with only one process instance.

Also, such event logs can contain errors introduced by the manual entry of the data. Additionally, the second computerized device automatically identifies the errors in the event logs based on whether the data violates expected log content. For example, the second computerized device can identify the errors by using workflow and process models, business and domain-specific rules, generic rules, organizational rules, etc.

The second computerized device classifies the errors into different classifications (including error-perspective classifications, error-type classifications, etc.). Again, the error-perspective classifications can include a control-flow error class, a data error class, a resource error class, a time error class, etc.; the error-type classifications can include an incorrect error class, a missing error class, an imprecise error class, an irrelevant error class, etc. Additionally, the second computerized device prioritizes the event logs into a priority order (e.g., based on a previously established error priority rank). The second computerized device transmits (to the first computerized device over the network) the event logs in the different classifications (and in the priority order) with identifications of the locations of the errors within the event logs.

The first computerized device outputs the event logs on a graphic user interface, and the first computerized device receives feedback into the graphic user interface in response to the output to alter the priority order and the different classifications of the event logs. The first computerized device transmits the feedback to the second computerized device, and the second computerized device alters the priority order and the different classifications of the event logs based on the feedback. Additionally, such systems can alter the recommendation models based on the feedback.

The second computerized device automatically generates recommendations to correct the errors using different recommendation processes based on the classifications of the errors. The recommendations can include, for example, removal of a log entry, insertion of a log entry, reposition of a log entry, etc. Furthermore, the different recommendation processes can include a replay process, a trace alignment process, etc. The second computerized device transmits the recommendations to correct the errors to the first computerized device, and the first computerized device outputs the recommendations through the graphic user interface.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
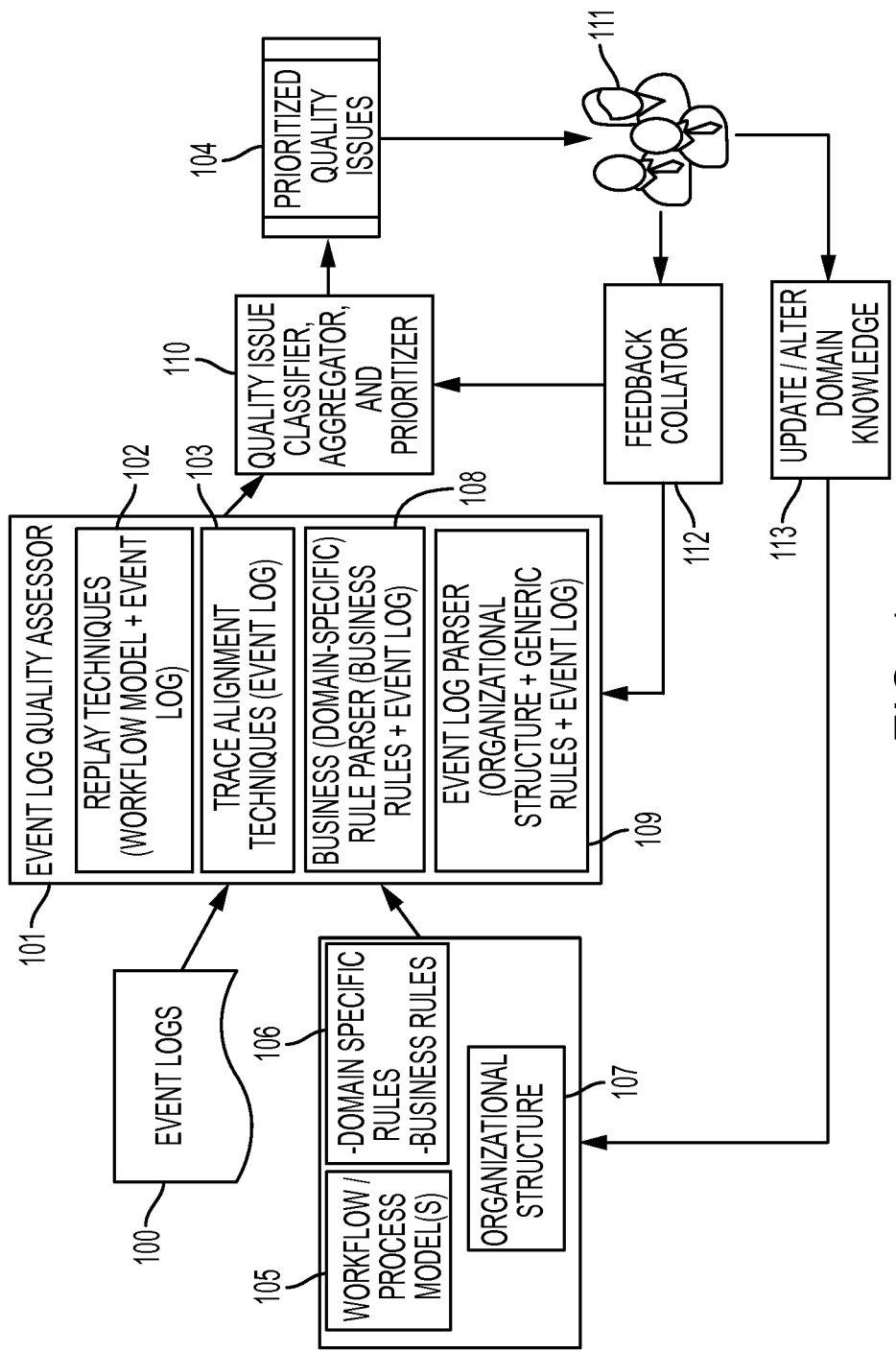
FIG. 1 is a schematic diagram illustrating systems herein.

As mentioned above, several data quality issues (e.g., missing data, incorrect data, irrelevant data, imprecise data, etc.) can develop in the process of generating event logs. This raises questions on the reliability of any insights obtained through analytics of manually executed activities. In view of this, the systems and methods herein process event logs related to manual process/workflow executions, identify complex quality issues, and provide techniques for correcting the logs. These systems and methods consider many perspectives of the process including control flow, data, resource, and time, and use these perspectives to provide recommendations to repair event logs. These systems and methods also identify any data quality issues that pertain to the domain. The systems and methods contain different components, such as a log quality assessor and log quality repair recommender.

More specifically, the systems and methods herein include many differentiating features including the ability to assess the quality of logs with respect to a process (they support a multitude of process formalisms) along four dimensions (control-flow, data, resource, and time). The systems and methods also assess the quality of logs against business (domain)-specific rules and classify quality issues and present these issues to the user, while also prioritizing quality issues. These systems and methods also present a seamless zoom-in/out facility to a region where the quality issue is shown in the event log and a recommender system for repairing the event logs to alleviate the quality issues that have been identified.

Event logs typically capture the execution of a process and contain information about cases or process instances (e.g., a job in a print shop corresponds to a process instance). Each process instance, identified by a unique ID, is made up of a sequence of events. Events can have attributes such as the activity name, timestamp (time at which the activity has been executed), resource (who/what executed the activity), data (that information on which the activity operates), etc. Each event may be associated to only one case/process instance. The sequence of activities corresponding to the sequence of events of a case can be regarded as a "trace." For example, a trace in a print shop job can be printing, cutting, binding, postage, and shipping. For simplicity, traces are also represented in encoded form such as abcde (where each symbol or character corresponds to an activity, e.g., a—print, b—cut, c—bind, d—add postage, e—ship).

There are several factors that influence the quality of logging manifested in event logs. At a generic level, this can be classified into four broad categories, for example. One category is "incorrect" data, which corresponds to the scenario where the data is logged incorrectly (for example, the order in which events are logged may be incorrect). Another is "missing" data, and this corresponds to the scenario where the data is not logged/is missing (for example, an event that occurred may not be logged, or the timestamp at which an event is executed is not logged). A third category is "imprecise" data that corresponds to the scenario where the logged information is too coarse, which results in a loss of precision (for example, the timestamp of an event may be logged only at day granularities (rather than seconds granularity)). This results in loss of information (e.g., for several events that occurred on a particular day, the exact order in which they are executed is unclear). A fourth factor is "irrelevant" data, and this corresponds to the scenario where the logged information is irrelevant for the context of analysis.

The above-mentioned issues are generic quality issues that can be seen across event logs of any domain. Furthermore, these issues can be manifested in four perspectives of processes/workflow; specifically the perspectives of control-flow, data, resource, and time. For example, the order in which events are logged could be incorrect (incorrect data-control-flow, e.g., a complete event of an activity is logged before the start event), a resource can be logged incorrectly for an event, data on which an activity operates can be logged incorrectly, or the timestamp at which an event occurred can be logged incorrectly. Note that the above-mentioned perspectives need not be orthogonal. For example, an issue with timestamps manifests indirectly in the control-flow (e.g., incorrect ordering of events).

In addition to the above-mentioned issues, there could be some quality issues specific to the domain of application. For example, a printer device in a print shop has certain specifications (it can print x pages per unit time t). However, it could have been logged that the printer handled y (>x) pages per unit time t. As another example, there could be certain constraints on the order in which an activity can be executed (mail should happen after print; however, for a particular case, mail could be the first event).

These systems and methods provide approaches for detecting data quality issues manifested in event logs pertaining to process executions. Such systems and methods consider four perspectives (control-flow, data, resource, and time) and provide recommendations for repairing the event logs. Furthermore, these also take into consideration domain-related aspects and checks for violations of those in the logged data.

As shown in FIG. 1, one of the components of the systems and methods is an event log quality assessor 101. The event log quality assessor 101 takes an input in an event log 100 and the multitude of elements which are concerned with the expected behavior of the process (pertaining to the event log 100). For example, one can provide the workflow/process model(s) 105, domain specific rules and business rules 106, generic rules, and the organizational perspective of the process (organizational structure 107).

The process/workflow models 105 can be provided in a multitude of formats, e.g., a formally rigor Petri net model or variants of such as YAWL (Yet Another Workflow Language), in the form of (linear) temporal constraints such as in declarative (DECLARE) workflows, Business Process Modeling Notation (BPMN), Event Driven Process Chains (EPCs) etc. The process models 105 can be annotated with additional information regarding the significance of activities etc (e.g., activity "A" is a critical task). Such significance metrics can be provided either qualitatively such as "high", "medium", "low" or can be assigned a quantitative figure, say between 0 and 1.

Domain-specific/business rules 106 can be specified in custom Domain Specific Languages (DSLs), in the form of if-then rules, or in the form of mathematical expressions as appropriate (e.g., the number of pages printed should be equal to the number of copies×number of books×number of pages per book). In addition, one can specify certain generic rules that event logs 100 are expected to follow, e.g., the start event of an activity (if it exists) should occur before the complete event. As in workflow models 105, one can assign different priority levels for the various business rules 106.

The organizational perspective 107 can specify the resources, their roles, department, sub-departments, groups, etc., pertaining to the organizational structure 107. Furthermore, one can specify the constraints on which resource/role can execute an activity in the process.

More specifically, in the event log quality assessor 101, different techniques can include replay techniques (workflow model and event log) 102; trace alignment techniques (event log) 103; a business (domain-specific) rule parser (business rules and event log) 108; and an event log parser (organizational structure, generic rules, and event log) 109.

Figure 2:
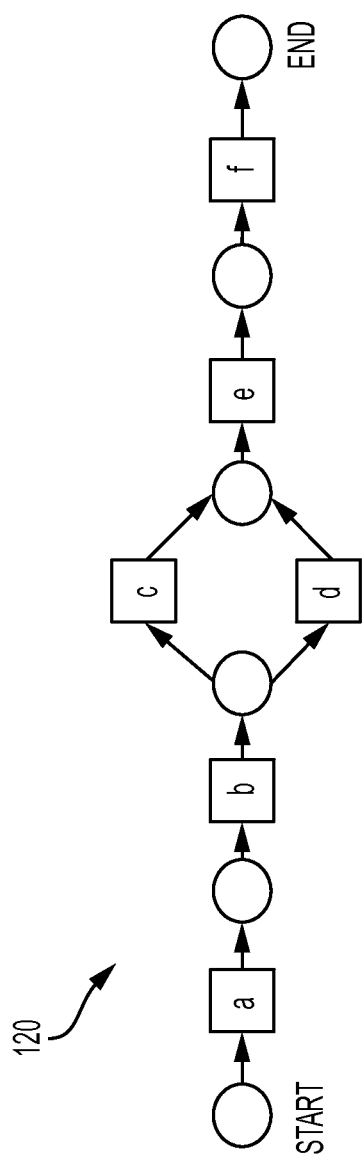
FIG. 2 is a schematic diagram of a Petri net used by systems herein.

In FIG. 2 item 120 shows a Petri net that could be used by the systems and methods described herein. A Petri net (also known as a place/transition net or P/T net) is one of several mathematical modeling languages for the description of distributed systems. A Petri net is a directed bipartite graph, in which the nodes (a-f) represent events that may occur, and the circles between the nodes represent conditions. Consider the trace abcde. Replaying this trace onto the Petri net 120 in FIG. 2 results in the alignment between the model and the trace as depicted in Model Log 130 in FIG. 3.

Figure 3:
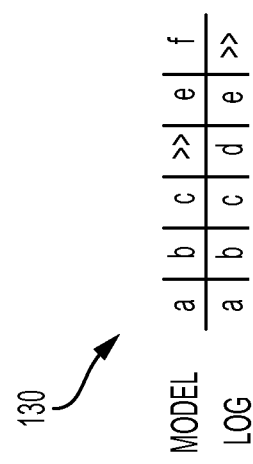
FIG. 3 is a schematic diagram of a model log used by systems herein.

In the alignment in FIG. 3, if a column contains two characters e.g., (a, a), then there is a movement on both the model and the trace. If the column contains (>>, x), then this implies that there is an activity 'x' in the trace that is not supposed to happen according to the model. In other words, there is an incorrect activity 'x'. If a column contains (x, >>), then this implies that an activity that is supposed to happen according to the model is not seen in the trace, i.e., there is a missing activity 'x' in the trace. In this fashion, if a workflow/process model is available, one can identify issues with missing/incorrect placement of activities.

Figure 4:
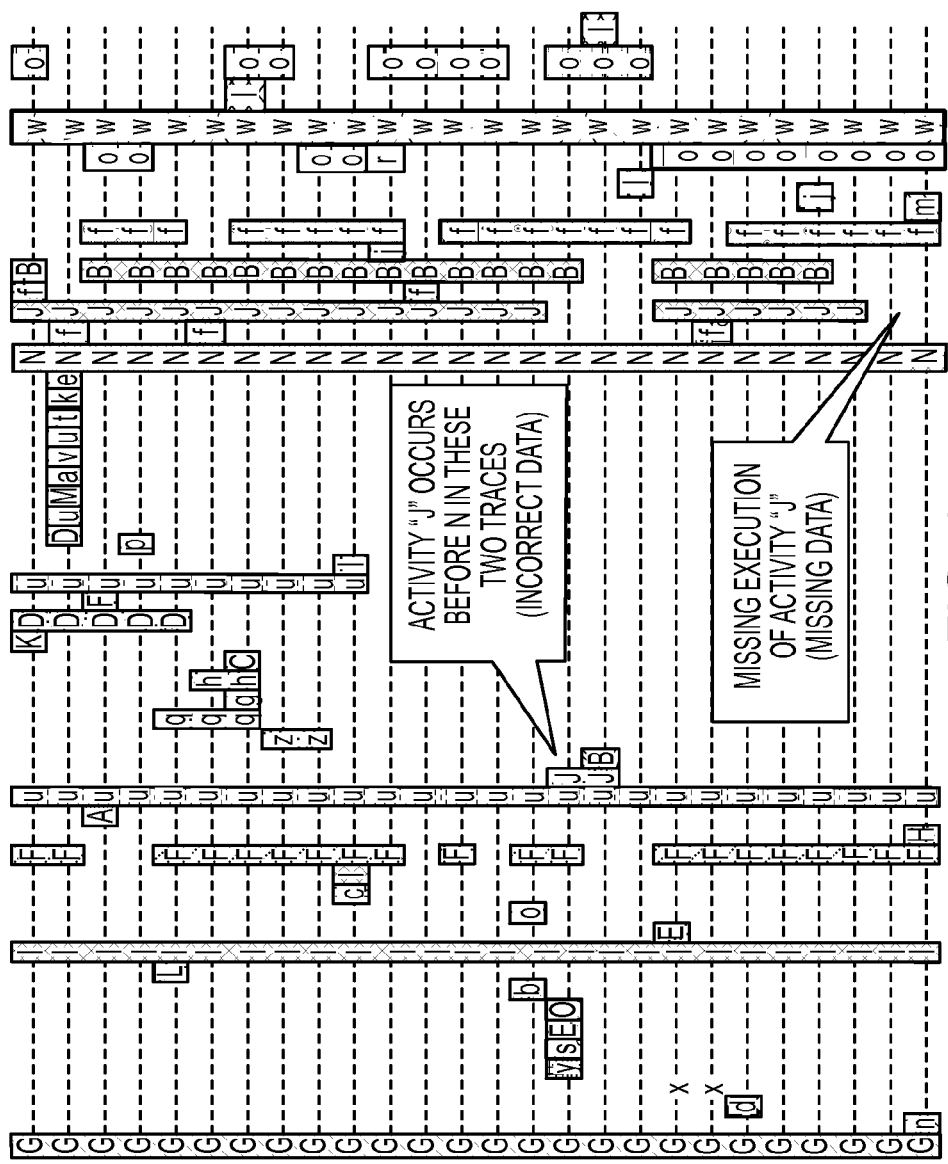
FIG. 4 is a schematic diagram illustrating trace alignment performed by systems herein.

In some scenarios, a process/workflow model 105 might not be readily available. Therefore, the systems and methods herein use trace alignment techniques 103 to assist in finding any exceptional behavior in the traces. A goal of trace alignment is to align the traces in such a way that event logs can be explored easily. FIG. 4 depicts an example of a trace alignment technique 103 and how trace alignment can help identify data quality issues such as missing and incorrect data.

More specifically, FIG. 4 illustrates an example of trace alignment and how trace alignment can help identify data quality issues such as missing and incorrect data. Each row in FIG. 4 corresponds to a trace. Gaps (-) in FIG. 4 are special symbols inserted into the alignment and help to identify missing/incorrect/exceptional executions.

As noted above, the event log quality assessor 101 shown in FIG. 1 also has a domain-specific/business rules parser 108 that parses an event log and the rules, and validates which rules are violated. The event log parser 109 (shown in FIG. 1) in addition can assess some generic log properties such as formatting errors, violation of orders (e.g., a complete event of an activity occurring before the start), any errors in logging pertaining to resources (e.g., resource names spelt incorrectly or in shortened form), activities executed by unprivileged resources/roles, etc. In addition, the event log parser 109 identifies any issue with respect to the impreciseness of data and irrelevancy of data by taking the context of analysis into picture (e.g., activities pertaining to department Y is irrelevant when analyzing the activities of department X, if no interaction happens between departments X and Y).

As shown in FIG. 1, once the event log quality assessor 101 identifies all the manifested data quality issues, one can classify the issues using several criteria 110 and provide different views to the user 111. For example, one can classify the issues into four different perspectives (control-flow, data, resource, and time) or can classify them based on their type (incorrect, missing, imprecise, and irrelevant). Furthermore, one can sort the identified issues according to their priority (output prioritized by quality issues in item 104), and this can be done holistically or within each category/class separately. These processes are handled by the quality issue classifier, aggregator, and prioritizer block 110 in FIG. 1.

The classified results are then presented to the user 111 for inspection. The user 111 is provided with interactive visualization means that can enable a seamless zoom-in/out functionality to get additional details on each identified quality issue. The system and methods also provide a feedback collator 112 for the user to provide feedback (such as reducing the priority, flagging an identified issue as a non-issue etc.). In addition the system provides the user an option to update or alter the domain knowledge base 113.

As noted above, the systems and methods contain different components, such as a log quality assessor 101 and a log quality repair recommender. The event log quality repair recommender component identifies and provides the user with a list of options to rectify (correct) the quality issues uncovered. The list can be sorted based on several factors. For example, one can use the support of the recommendation in all good cases in the event log to sort the recommendations. The user can choose from the recommended list, can edit the recommendations, or can provide a new resolution for the identified issue. Such corrections to recommendations will be fed back into the system and utilized for subsequent recommendations.

Figures 5, 6:
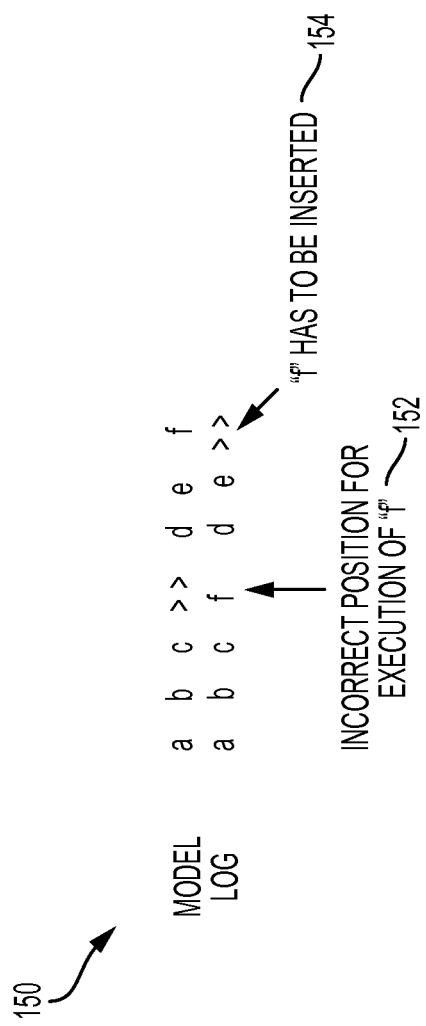
FIG. 5 is a schematic diagram of a model log used by systems herein.
FIG. 6 is a schematic diagram of a model log used by systems herein.

For resolving control-flow related issues, the systems and methods described herein provide different strategies based on the availability or non-availability of workflow/process models 105. FIG. 5 illustrates a model log showing how control-flow quality issues are resolved. For instances when workflow(s) are available, the replay of event logs on the workflow identifies what sort of deviations occurred and where they manifest in each trace of the event log. For example, FIG. 3 depicts an alignment obtained by replaying a trace on a model. Alignments provide cues on two sorts of quality issues, missing and incorrect data (activities). The systems and methods described herein parse alignments and take appropriate actions. Recommendations could include the removal of an activity, insertion of an activity, or repositioning activities. Among these, removal of activities is the simplest of recommendations.

For recommending insertion of activities at a position in a trace, the systems and methods described herein consider different possibilities. One scenario is where the concerned activity is executed in a trace but at a different position (i.e., incorrect position of activity) and another scenario is where the activity is not executed in a trace at all. Thus, when an activity is executed in a trace but at a different position, a recommendation would be to remove the activity at the wrong position and insert it at the right position.

For some aspects of analysis, this is straightforward (e.g., if one is interested in discovering the control-flow of the process, the relative order of activities is sufficient). However, for other aspects, this is more involved (e.g., if one is interested in performance analysis, such as execution time); thus, the systems and methods herein recommend the appropriate timestamp at which this activity could have been executed. The systems and methods herein estimate this based on other similar cases in the event log. The systems and methods herein identify the top "k" cases most similar to this case (finding this top "k" can be done in several ways, e.g., using clustering techniques, probabilistic approaches, and automata based approaches, etc.). The estimate timestamp for recommendation is derived from these 'k' cases. For example, systems and methods herein can consider the activities to the left and to the right of activity "x" (to be inserted) and identify the average time difference between "x" and its left/right activities and choose that for recommendation. The rest of the attributes remain the same as that of the activity from the trace (e.g., the resource remains the same).

FIG. 5 gives an example of this scenario. In the model log alignment 150, systems and methods herein realize that activity "f" 152 is wrongly positioned in the trace (log) and that the activity "f" is missing at the last position 154 according to the model. Clearly, the activity 'f' at position 4 is to be pushed to position 7. Thus, the systems and methods herein move "f" to position 7 (as shown by arrow 162 in FIG. 6) and set the timestamp of "f" based on other cases similar to this case where "f" has been executed subsequent to "e". The rest of the attributes such as the data on which "f" operates, the resource who executed "f" remains the same as that of the activity at position "4".

Figure 7:
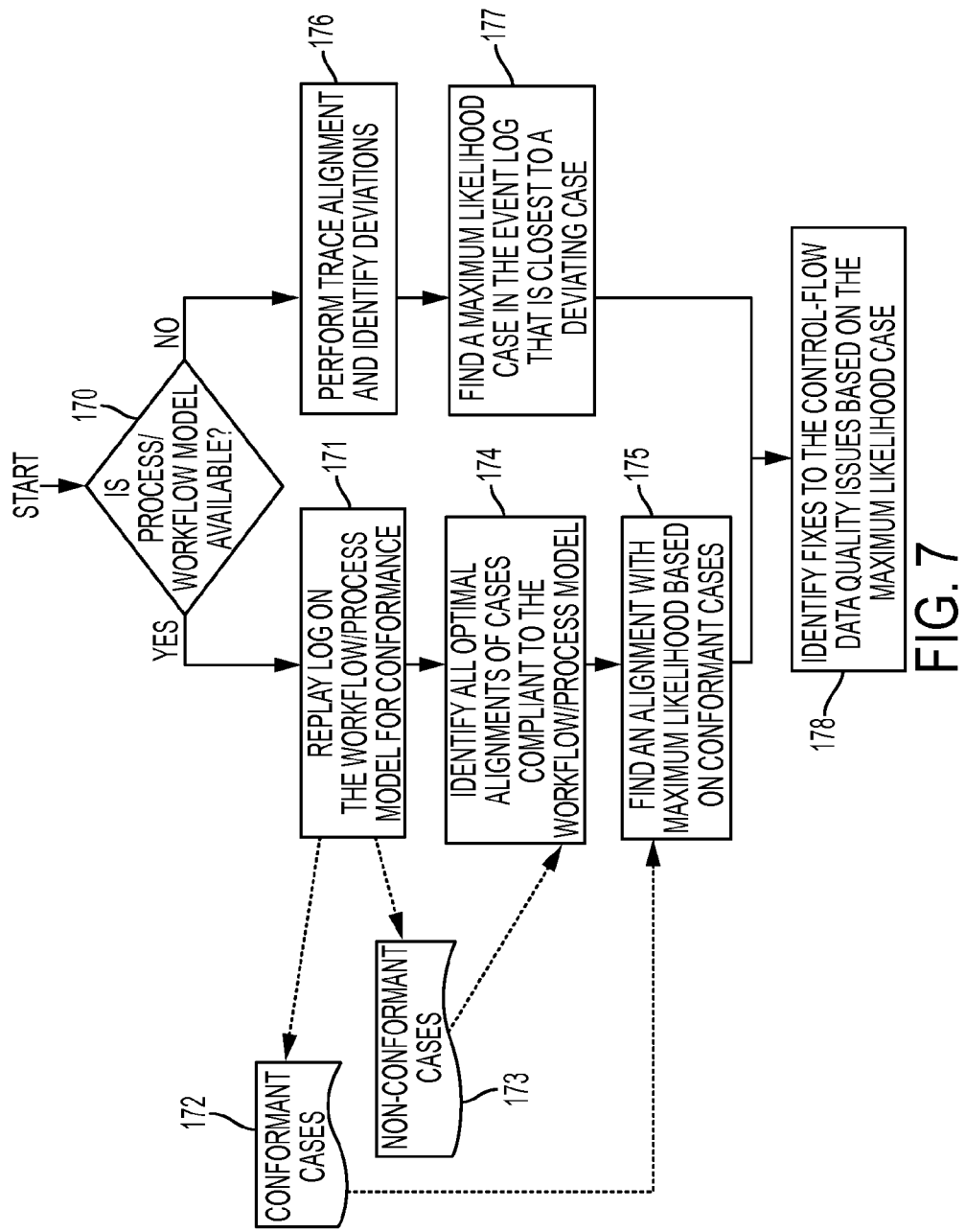
FIG. 7 is a flow diagram illustrating processing performed by systems and methods herein.

FIG. 7 illustrates a flowchart for identifying fixes to control-flow data quality issues using replay and trace alignment techniques. In decision box 170, the process determines whether a process/workflow model is available. For instances when process/workflow(s) model (s) are available, processing proceeds to item 171 where the log on the workflow/process model is replayed to identify conformance and non-conformance cases, which are output as items 172 (conformant cases) and 173 (non-conformant cases). In item 174, the process identifies all optimal alignments of wrongly positioned activities in the trace (for cases that are compliant to the workflow/process model) using the non-conformant cases shown in item 173. In item 175, the process finds an alignment (of the optimal alignments from item 174) that has the maximum likelihood of correcting each wrongly positioned activity in the trace, based on the conformant cases shown in item 172.

If no process/workflow method is available in item 170, processing proceeds to item 176 where a trace alignment is performed and deviations are identified. In item 177, the processing finds cases in the event log that have the maximum likelihood of being closest to each deviating case identified in item 176. In item 178, the processes identify fixes to the control-flow data quality issues based on the maximum likelihood cases found in items 175 and 177.

Figure 8:
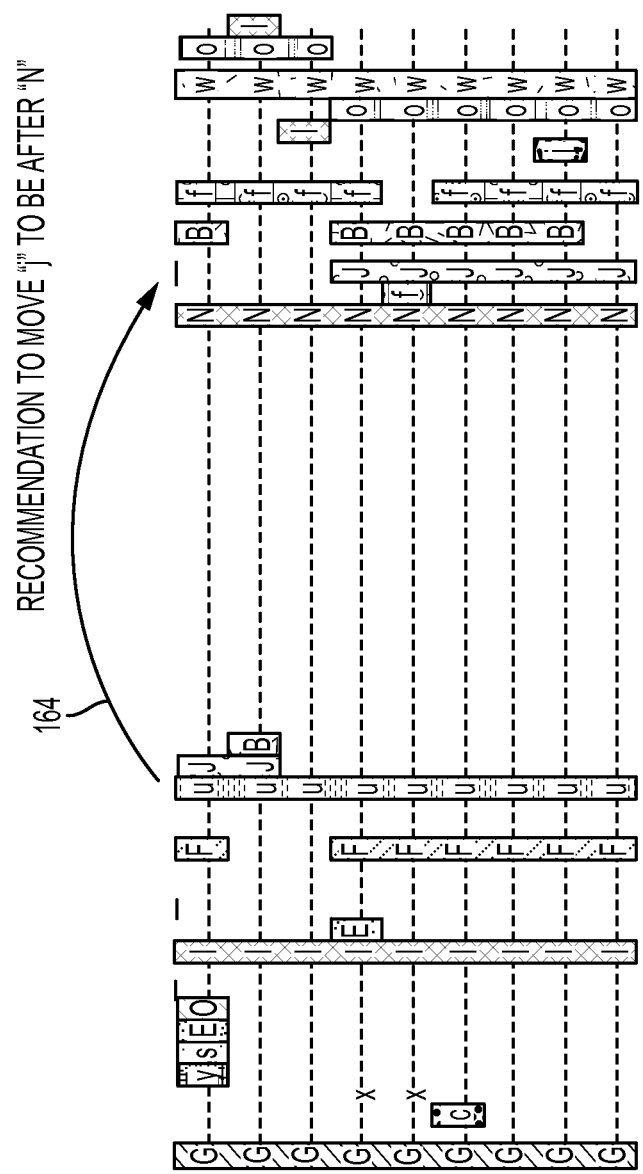
FIG. 8 is a schematic diagram illustrating trace alignment performed by systems herein.

Thus, as shown in FIG. 7, for cases where there are not process/workflow models, the systems and methods herein utilize trace alignment to identify recommendations. Therefore, the systems and methods herein can remove an activity, insert an activity, or move activities. FIG. 8 illustrates using trace alignment to identify fixes to control-flow issues. More specifically, arrow 164 in FIG. 8 depicts an example of using trace alignment for identifying the movement of activity "J" from the column next to activity "u" to the column next to activity "N."

Therefore, the systems and methods herein provide an approach for detecting data quality issues manifested in event logs pertaining to process executions. The systems and methods herein consider four perspectives (control-flow, data, resource, and time) and provide recommendations for repairing the event logs. Furthermore, the systems and methods herein also takes into consideration domain-related aspects and check for violations of those in the logged data.

Figure 9:
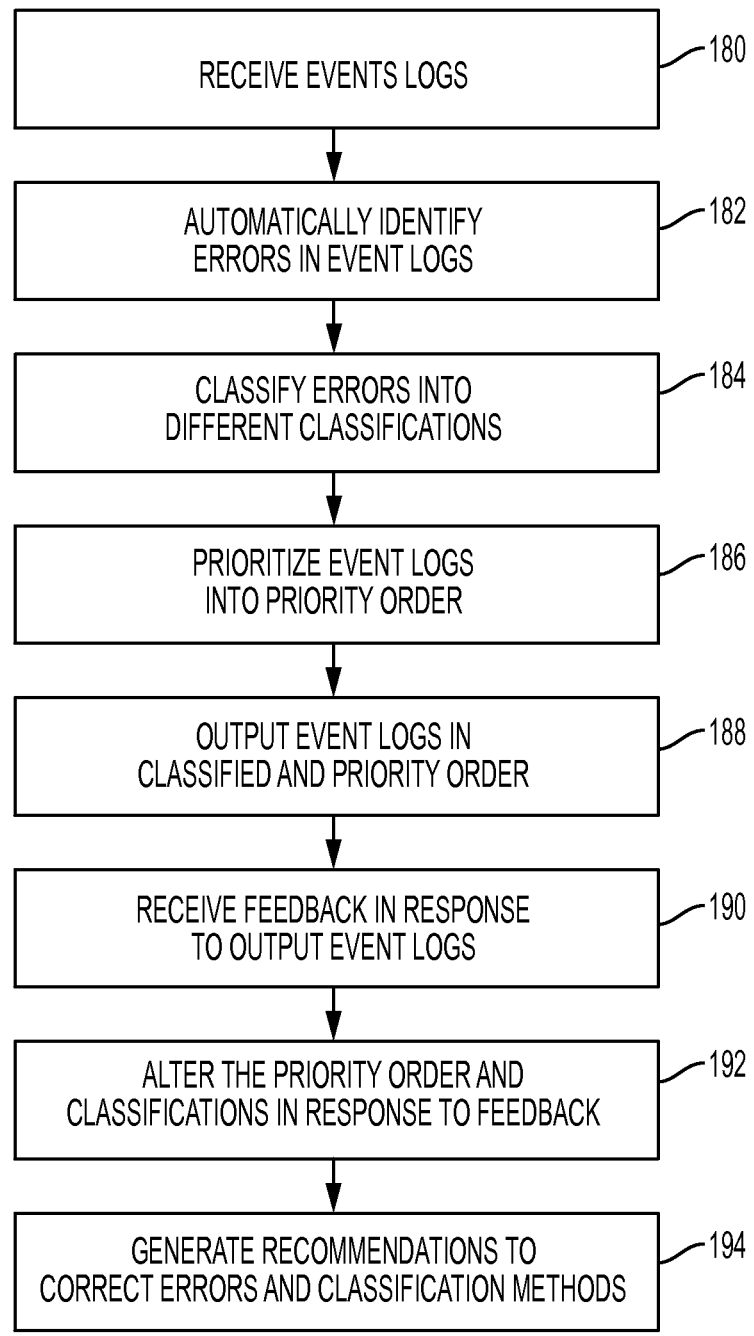
FIG. 9 is a flow diagram illustrating processing performed by systems and methods herein.

FIG. 9 is flowchart illustrating exemplary methods herein. In item 180, these methods herein receive event logs that include manually entered data of executed processes. For example, each of the executed processes can contain a sequence of events, and each of the event attributes can include an activity name, a timestamp, a resource, activity data, etc. Each event is generally associated with only one process instance.

The event logs may contain errors introduced by the manual entry of the data. Therefore, in item 182 these methods automatically identify the errors in the event logs based on whether the data violates expected log content. For example, the methods herein can identify the errors by using workflow and process models, business and domain-specific rules, generic rules, organizational rules, etc.

In item 184, the methods herein classify the errors into different classifications that can include "error-perspective" classifications, "error-type" classifications, etc. The error-perspective classifications can include a "control-flow" error class, a "data" error class, a "resource" error class, a "time" error class, etc. The error-type classifications can include an "incorrect" error class, a "missing" error class, an "imprecise" error class, an "irrelevant" error class, etc.

The methods herein prioritize the event logs into a priority order (based on a previously established error priority ranking) in item 186. Further, these methods output the event logs classified into different classifications (and in priority order) in item 188. The methods receive feedback in response to outputting the event logs, as shown in item 190 and, in response, alter the priority order and the different classifications of the event logs in item 192.

Further, in item 194, these methods automatically generate recommendations to correct the errors, using different recommendation processes based on the classifications of the errors. The different recommendation processes can include, for example, a replay process, a trace alignment process, etc. The recommendations can include recommending removal of a log entry, insertion of a log entry, repositioning of a log entry, etc. The event logs are output in the different classifications and in the priority order, and the locations of the errors within the event logs are identified by the methods herein.

As would be understood by one ordinarily skilled in the art, the processes described herein are not human activities, and instead such processes can only be performed by a machine (especially when the volume of data being processed, and the speed at which such data needs to be evaluated is considered). For example, if one were to manually attempt to perform the log error identification and correction discussed above, the manual process would be sufficiently inaccurate and take an excessive amount of time so as to render the manual classification results useless. Specifically, processes such as receiving event logs, automatically identifying log errors, automatically classifying the log errors, automatically prioritizing the event logs, automatically generating recommendations to correct the errors, etc., requires the utilization of different specialized machines, and humans performing such processing would not produce useful results because of the time lag, inconsistency, and inaccuracy humans would introduce into the results.

Additionally, the methods herein solve many highly complex technological problems. For example, as mentioned above, manually created event logs present data quality issues (e.g., missing data, incorrect data, irrelevant data, imprecise data, etc.) that raise questions at to the reliability of any insights obtained through analytics of manually executed activities. Methods herein solve this technological problem automatically identifying log errors, automatically classifying the log errors, automatically prioritizing the event logs, automatically generating recommendations to correct the errors, etc.). This reduces the amount of electronic storage that a user must maintain, and also reduces the technological burden that a user is required to satisfy. By granting such benefits to users, the systems and methods herein reduce the amount and complexity of hardware and software needed to be purchased, installed, and maintained by providers, thereby solving a substantial technological problem that providers experience today.

Figure 10:
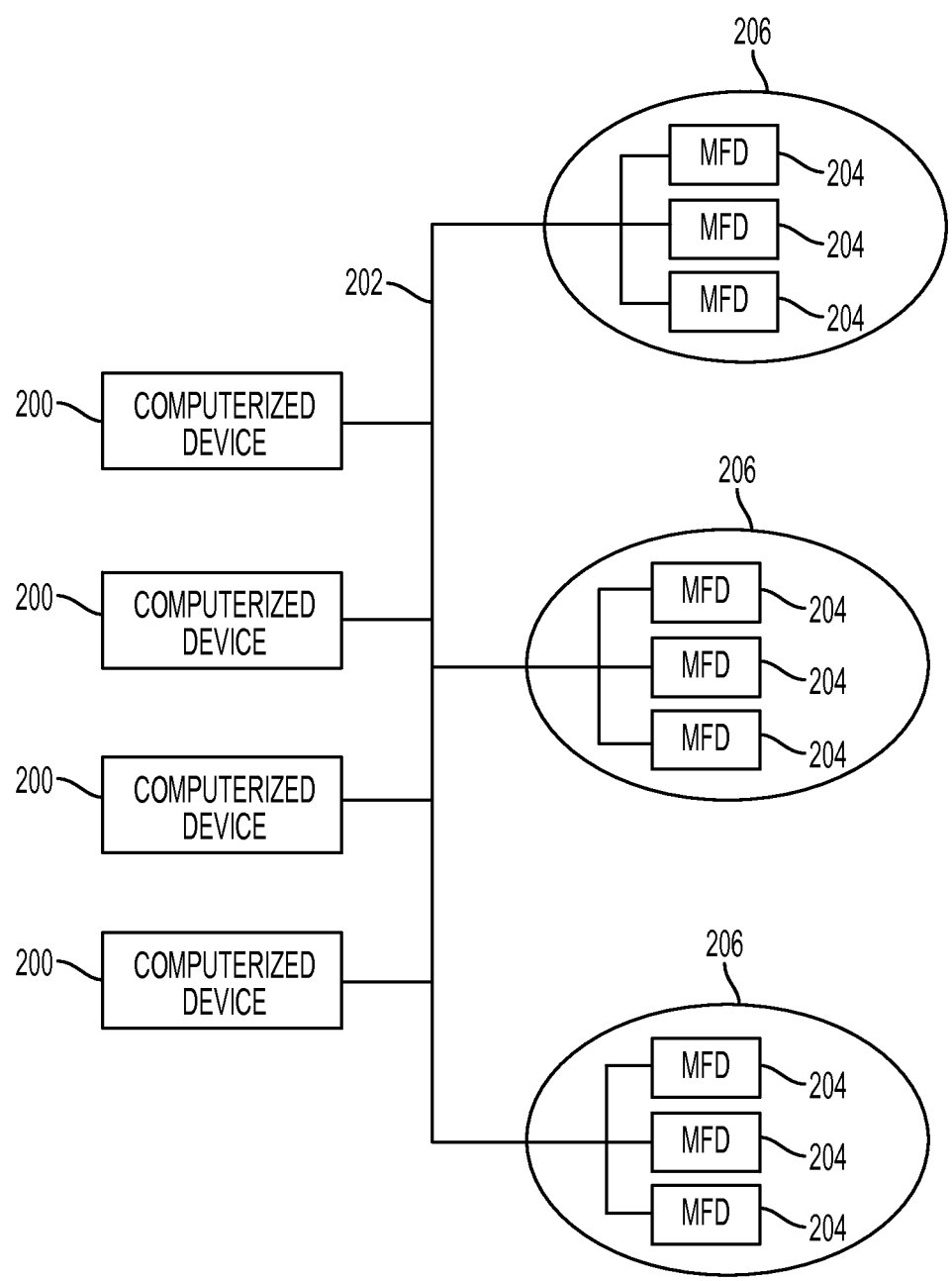
FIG. 10 is a schematic diagram illustrating systems herein.

As shown in FIG. 10, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 11:
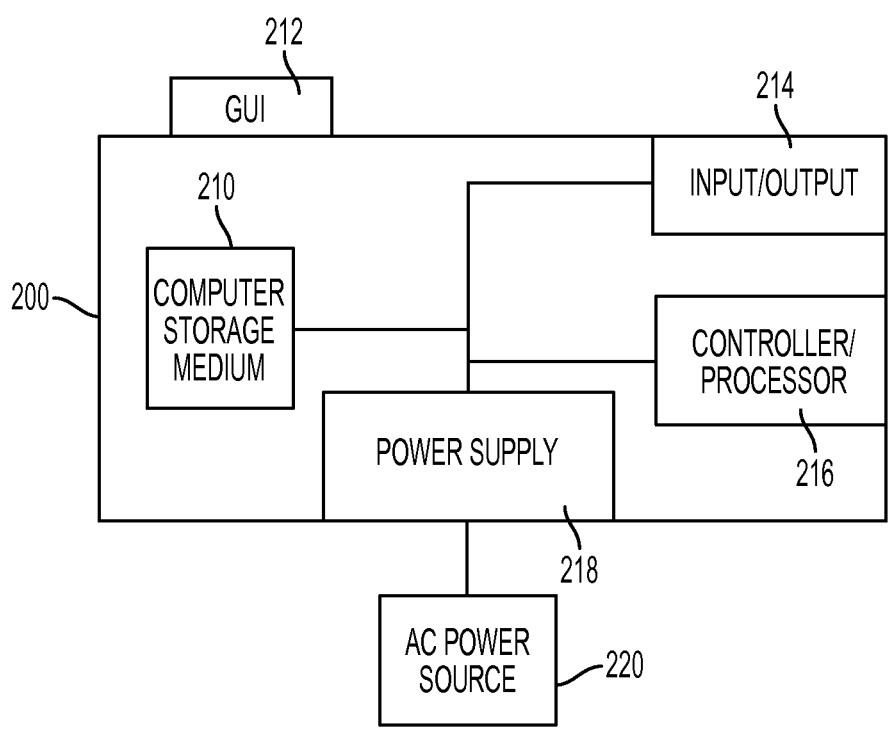
FIG. 11 is a schematic diagram illustrating devices herein.

FIG. 11 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 11, a body housing has one or more functional components that operate on power supplied from an alternating current (AC) source 220 by the power supply 218. The power supply 218 can comprise a common power conversion unit, power storage element (e.g., a battery, etc), etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving created event logs comprising manually entered data of executed processes, said event logs containing errors introduced by manual entry of said data of executed processes;
   automatically identifying said errors in said event logs based on said data of executed processes violating expected log content;
   classifying said errors into classifications including error-perspective classifications and error-type classifications,
   prioritizing said event logs into a priority order based on a previously established error priority ranking;
   outputting said event logs in said classifications and in said priority order;
   receiving feedback in response to said outputting said event logs to alter said priority order and said classifications of said event logs;
   automatically generating recommendations to correct said errors using different recommendation processes based on said classifications of said errors and a trace alignment process, said trace alignment process finds an alignment with a conformant trace that has the maximum likelihood of correcting each error in an error trace; and
   outputting said recommendations, said error-perspective classifications comprising:
  a control-flow error class;
  a data error class;
  a resource error class; and
  a time error class, and
said error-type classifications comprising:
  an incorrect error class;
  a missing error class;
  an imprecise error class; and
  an irrelevant error class.

2. The method according to claim 1, said outputting said event logs in said classifications and in said priority order further comprising identifying a location of said errors within said event logs.

3. The method according to claim 1, said identifying said errors comprising applying, to said event logs, at least one of the following:
  workflow and process models;
  business and domain-specific rules;
  generic rules; and
  organizational rules.

4. The method according to claim 1, said recommendations comprising removal of a log entry, insertion of a log entry, and repositioning of a log entry.

5. The method according to claim 1, further comprising:
  receiving feedback in response to said outputting said recommendations; and
  altering said recommendation processes based on said feedback to said recommendations.

6. The method according to claim 1, each of said executed processes comprising a sequence of events, each of said events comprising attributes including an activity name, a timestamp, a resource, activity data, and
  each event being associated to only one process instance.

7. A method comprising:
  receiving manually created event logs comprising manually entered data of executed processes, said event logs containing errors introduced by manual entry of said data of executed processes;
  automatically identifying said errors in said event logs based on said data of executed processes violating expected log content;
  classifying said errors into classifications including error-perspective classifications and error-type classifications,
  prioritizing said event logs into a priority order based on a previously established error priority ranking;
  outputting said event logs in said classifications and in said priority order;
  receiving feedback in response to said outputting said event logs to alter said priority order and said classifications of said event logs;
  automatically generating recommendations to correct said errors using different recommendation processes based on said classifications of said errors, said different recommendation processes comprising a replay process and a trace alignment process, said trace alignment process finds an alignment with a conformant trace that has the maximum likelihood of correcting each error in an error trace; and
  outputting said recommendations,
said error-perspective classifications comprising:
  a control-flow error class;
  a data error class;
  a resource error class; and
  a time error class, and
said error-type classifications comprising:
  an incorrect error class;
  a missing error class;
  an imprecise error class; and
  an irrelevant error class.

8. The method according to claim 7, said outputting said event logs in said classifications and in said priority order further comprising identifying a location of said errors within said event logs.

9. The method according to claim 7, said identifying said errors comprising applying, to said event logs, at least one of the following:
  workflow and process models;
  business and domain-specific rules;
  generic rules; and
  organizational rules.

10. The method according to claim 7, said recommendations comprising removal of a log entry, insertion of a log entry, and repositioning of a log entry.

11. The method according to claim 7, further comprising:
  receiving feedback in response to said outputting said recommendations; and
  altering said recommendation processes based on said feedback to said recommendations.

12. The method according to claim 7, each of said executed processes comprising a sequence of events, each of said events comprising attributes including an activity name, a timestamp, a resource, activity data, and
  each event being associated to only one process instance.

13. A system comprising:
  a first computerized device receiving manually created event logs comprising manually entered data of executed processes, said event logs containing errors introduced by manual entry of said data of executed processes;
  a second computerized device automatically identifying said errors in said event logs based on said data of executed processes violating expected log content; and
  a computerized network operatively connecting said first computerized device to said second computerized device,
  said second computerized device classifying said errors into classifications including error-perspective classifications and error-type classifications,
  said second computerized device prioritizing said event logs into a priority order based on a previously established error priority ranking,
  said second computerized device transmitting said event logs in said classifications and in said priority order to said first computerized device over said network,
  said first computerized device outputting said event logs on a graphic user interface of said first computerized device,
  said first computerized device receiving feedback into said graphic user interface in response to said outputting said event logs to alter said priority order and said classifications of said event logs,
  said first computerized device transmitting said feedback to said second computerized device,
  said second computerized device altering said priority order and said classifications of said event logs based on said feedback,
  said second computerized device automatically generating recommendations to correct said errors using different recommendation processes based on said classifications of said errors, said different recommendation processes comprising a replay process and a trace alignment process, said trace alignment process finds an alignment with a conformant trace that has the maximum likelihood of correcting each error in an error trace, said second computerized device transmitting said recommendations to correct said errors to said first computerized device, said first computerized device outputting said recommendations through said graphic user interface, said error-perspective classifications comprising:
- a control-flow error class;
- a data error class;
- a resource error class; and
- a time error class, and said error-type classifications comprising:
- an incorrect error class;
- a missing error class;
- an imprecise error class; and
- an irrelevant error class.

14. The system according to claim 13, said outputting said event logs in said classifications and in said priority order further comprising identifying a location of said errors within said event logs.

15. The system according to claim 13, said identifying said errors comprising applying, to said event logs, at least one of the following:
- workflow and process models;
- business and domain-specific rules;
- generic rules; and
- organizational rules.

16. The system according to claim 13, said recommendations comprising removal of a log entry, insertion of a log entry, and repositioning of a log entry.

17. The system according to claim 13, further comprising:
- receiving feedback in response to said outputting said recommendations; and
- altering said recommendation processes based on said feedback to said recommendations.

* * * * *